United States Patent

Furusawa

[11] Patent Number: 5,986,982
[45] Date of Patent: Nov. 16, 1999

[54] OPTICAL DISK DEVICE WITH OPTICAL PATH LENGTH CHANGING MEMBER

[75] Inventor: Koji Furusawa, Tokyo, Japan

[73] Assignee: NEC Corporation, Tokyo, Japan

[21] Appl. No.: 08/966,059

[22] Filed: Nov. 7, 1997

[30] Foreign Application Priority Data

Nov. 7, 1996 [JP] Japan .................................. 8-294831

[51] Int. Cl.⁶ ...................................................... G11B 7/09
[52] U.S. Cl. ...................................... 369/44.14; 369/44.17
[58] Field of Search ............................. 969/44.14, 44.23, 969/44.15, 44.17, 44.18, 94, 58, 54

[56] References Cited

U.S. PATENT DOCUMENTS 5,216,534  6/1993  Boardman et al. .................. 369/44.18
5,721,723  2/1998  Uchimaru et al. ................... 369/44.15

FOREIGN PATENT DOCUMENTS

712122A2  5/1996  European Pat. Off. .
6282866  10/1994  Japan .

Primary Examiner—Thang V. Tran
Attorney, Agent, or Firm—Hayes, Soloway, Hennessey, Grossman & Hage PC

[57] ABSTRACT

An optical disk device for projecting laser light emitted from a laser light source on an optical disk to reproduce information has a support shaft which is disposed nearly parallel with an optical axis of the laser light. The support shaft is fixed on a mount. A lens holder is rotatably disposed around the support shaft and reciprocally movable along the support shaft as well as holding an objective lens for converging the laser light upon a recording plane of the optical disk. The device also includes a tracking drive for energizing the rotation movement of the lens holder, and a focusing drive for energizing the reciprocative movement along the support shaft of the lens holder. An optical path length changing member is provided which has a change region where an optical path length is changed when the laser light is transmitted therethrough and an unchanged region where an optical path length is not changed when the laser light is transmitted therethrough is located closer to the optical disk than the lens holder and rotatably disposed around the support shaft and reciprocally movable along the support shaft. Completing the device is a linking mechanism for variably effecting the engagement or disengagement of the optical path length changing member with the lens holder.

2 Claims, 3 Drawing Sheets

OPTICAL DISK DEVICE WITH OPTICAL PATH LENGTH CHANGING MEMBER

FIELD OF THE INVENTION

This invention relates to an optical disk device, and more particularly to, an optical disk device used in the reproducing of both a normal optical disk and a high-density optical disk where a plurality of optical disks are fixed together.

BACKGROUND OF THE INVENTION

Conventionally, there is a technique that two optical disks with a thickness half that of a normal optical disk are fixed together to produce a high-density optical disk. There has been developed an optical disk device which is applicable to both a normal optical disk and such a high-density optical disk. For example, Japanese patent application laid-open No. 6-282866(1994) discloses an optical disk device with a transparent plate which can be releasably placed on the optical path of laser light to be projected so as to change the optical path length from an optical head to a recording plane of an optical disk between a normal optical disk and a high-density optical disk.

However, the optical disk device disclosed in Japanese patent application laid-open No. 6-282866(1994) has problems in that the mechanism for releasably positioning the transparent plate requires a separate driving source inside the optical disk device which prevents miniaturizing the device complicates the device structure and increases the number of parts.

On the other hand, in this optical disk device, an objective lens of the optical head is driven to perform the focusing operation to change the distance (working distance) from there to the optical disk. However, the distance from the transparent plate to the optical disk is fixed when the transparent plate is located in the optical path of laser light. Therefore, when the driving distance of the objective lens is greatly increased due to a great plane pitching of the optical disk, the objective lens may contact the transparent plate.

SUMMARY OF THE INVENTION

Accordingly, it is an object of the invention to provide an optical disk device which has a structure able to be miniaturized, lightened and simplified.

It is a further object of the invention to provide an optical disk device where the collision between an objective lens and an optical path length changing means in the focusing operation is effectively prevented.

According to the invention, an optical disk device for projecting laser light emitted from a laser light source on an optical disk to reproduce information, comprises:

a support shaft which is disposed nearly parallel with an optical axis of the laser light;

a mount on which the support shaft is fixed;

a lens holder which is disposed to be rotatable around the support shaft and reciprocatively movable along the support shaft as well as holding an objective lens for converging the laser light upon a recording plane of the optical disk;

a tracking drive means for activating rotational movement of the lens holder;

a focusing drive means for activating the reciprocative movement along the support shaft of the lens holder;

an optical path length changing member which has a change region where an optical path length is changed when the laser light is transmitted therethrough and an unchanged region where an optical path length is not changed when the laser light is transmitted therethrough and is located closer to the optical disk than the lens holder and disposed to be rotatable around the support shaft and reciprocatively movable along the support shaft; and a linking mechanism for variably providing the engagement of the optical path length changing member with the lens holder or the disengagement of the optical path length changing member from the lens holder.

In this embodiment, prior to the reproducing of, for example, a normal optical disk, the objective lens and the unchanged region of the optical path length changing member, through which laser light is projected on the recording plane of the optical disk, are placed on the optical axis of laser light. In this state, the tracking and focusing operations are conducted by the tracking drive means and the focusing drive means while engaging the lens holder with the optical path length changing member by the linking mechanism.

In case of reproducing of a high-density optical disk where two optical disks are fixed together, the engagement by the linking mechanism is released, where only the lens holder can be rotated around the support shaft by the tracking drive means, and then the lens holder and the optical path length changing member are engaged again by the linking mechanism so as to locate the objective lens to be opposite to the change region of the optical path length changing member. Thereby, the lens holder and the optical path length changing member are simultaneously rotated around the support shaft by the tracking drive means to place the objective lens and the change region of the optical path length changing member on the optical axis of laser light.

Then, projecting laser light, the tracking and focusing operations are conducted by the tracking drive means and the focusing drive means while engaging the lens holder with the optical path length changing member by the linking mechanism. In this case, the laser light is projected on the recording plane of the high-density optical disk while having an optical path length equal to that in case of a normal optical disk by transmitting through the change region of the optical path length changing member. Thus, the reproducing is conducted like the case of a normal optical disk.

Further, the linking mechanism may comprise a regulating means for regulating the movement of the optical path length changing member to the lens holder within a predetermined amount of movement, and a engaging means which is disposed between the optical path length changing member and the lens holder for providing connection or separation of the optical path length changing member and the lens holder according to a variation in distance between them.

In this embodiment, in case of the reproducing of a normal optical disk, laser light is projected through the objective lens and the unchanged region of the optical path length changing member, and the tracking and focusing operations are conducted while engaging the lens holder with the optical path length changing member by the linking mechanism. In the focusing operation, the movement along the support shaft is conducted within a range not to be regulated by the regulating means, and the optical path length changing member can therefore follow the lens holder. In other words, the amount of movement to be regulated by the regulating means is set to be greater than the amount of movement to be regulated by a normal focusing operation.

When the normal optical disk is replaced by a high-density optical disk, the lens holder is activated to move to separate from the optical path length changing member by the focusing drive means. This movement is conducted beyond the amount of movement to be regulated by the regulating means. Therefore, the regulating means prevents the optical path length changing member from moving to separate the optical path length changing member and the lens holder.

Thereby, the engagement by the engaging means is released, where only the lens holder can be rotated around the support shaft by the tracking drive means, and then the movement of the lens holder toward the optical path length changing member is activated by the focusing drive means at a position where the objective lens is opposite to the change region of the optical path length changing member. Thereby, the lens holder and the optical path length changing member are connected by the engaging means and then are simultaneously rotated around the support shaft by the tracking drive means to place the objective lens and the change region of the optical path length changing member on the optical axis of laser light. The following operations are conducted as described above.

Furthermore, in addition to the above embodiment, the engaging means may comprise an engaging protrusion which is formed on one of the lens holder and the optical path length changing member, and positioning holes which are formed on the other of the lens holder and the optical path length changing member opposite to the engaging protrusion and individually correspond to the change region and the unchanged region of the optical path length changing member.

In this embodiment, the operations are conducted like the above. In case of the reproducing of a normal optical disk, the tracking and focusing operations are conducted while engaging the engaging protrusion of the engaging means with the positioning hole corresponding to the unchanged region.

In case of reproducing of a high-density optical disk, the optical path length changing member and the lens holder are separated by the focusing drive means and the engagement is released by disengaging the engaging protrusion from the positioning hole. Thus, only the lens holder can be rotated around the support shaft by the tracking drive means, and then the lens holder and the optical path length changing member are engaged again so as to locate the engaging protrusion to be opposite to the positioning hole corresponding to the change region. The following operations are as described above.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
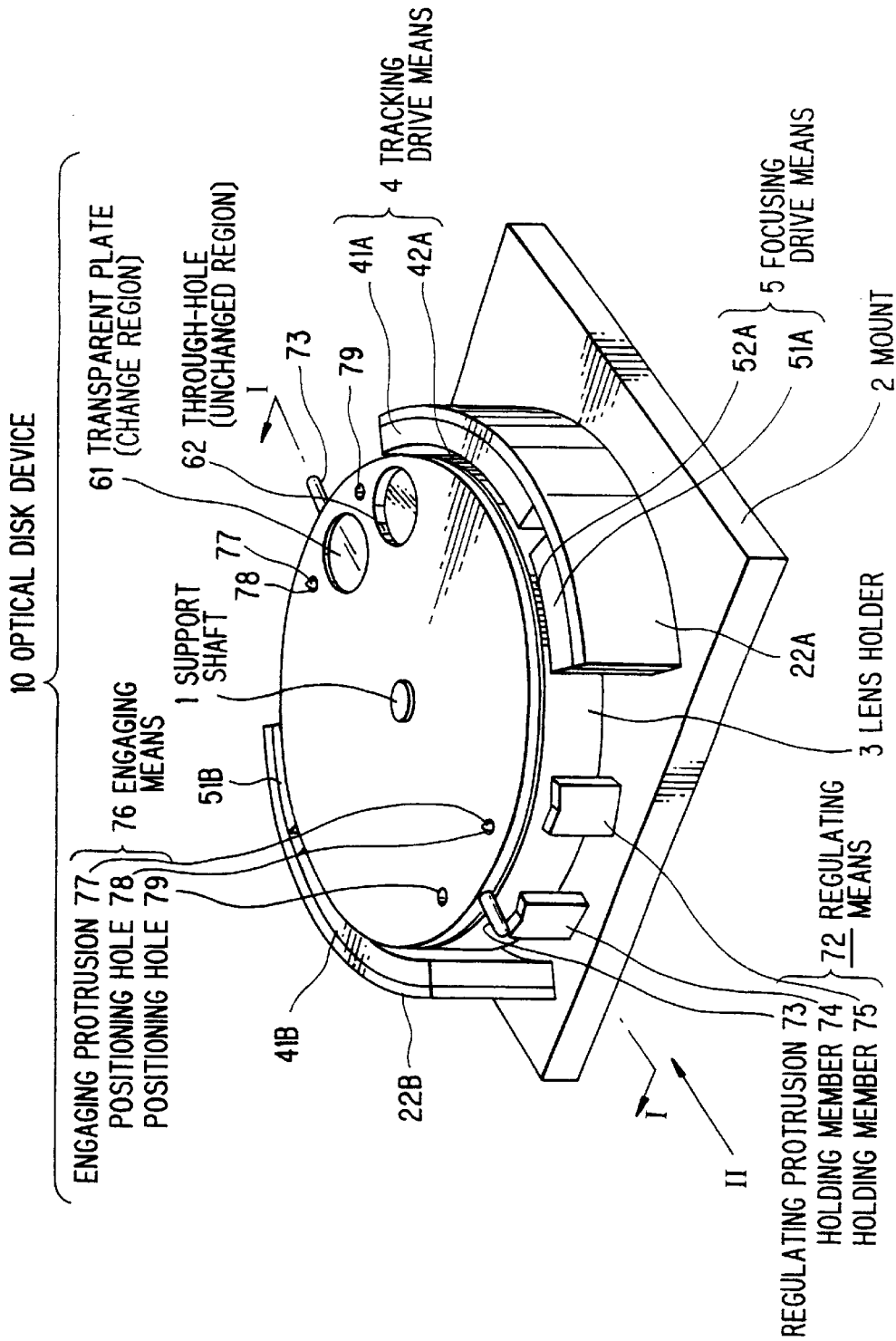
FIG. 1 is a perspective view showing an optical disk device in a preferred embodiment according to the invention.

An optical disk device in the preferred embodiment will be explained in FIGS. 1 to 3E.

In this embodiment, illustrated is an optical disk device 10 where laser light R emitted from a laser light source (not shown) is projected on an optical disk to conduct the reproducing. The optical disk device 10 is applicable to both a normal optical disk and a high-density optical disk where two optical disks with a thickness half that of a normal optical disk are fixed together.

The optical disk device 10 is composed of a support shaft 1 disposed almost parallel with the optical axis of laser light R, a mount 2 for fixing the support shaft 1, a lens holder 3 which is mounted to be rotatable around the support shaft 1 and reciprocally movable along the support shaft 1 as well as holding an objective lens 31 for converging laser light R upon the recording plane of the optical disk, a tracking drive means 4 which activates the rotational movement of the lens holder 3, and a focusing drive means 5 which activates the reciprocal movement along the support shaft 1 of the lens holder 3.

Further, the optical disk device 10 is composed of an optical path length changing member 6 which has a transparent plate 61 as a change region where the optical path length is changed to laser light R to be transmitted therethrough and a through-hole 62 as an unchanged region where it is not changed, and is located on the side of the optical disk D over the lens holder 3 and is mounted to be rotatable around the support shaft 1 and reciprocally movable along the support shaft 1, and a linking mechanism 7 for conducting the switching of the linking and unlinking between the optical path length changing member 6 and the lens holder 3.

Next, the above-mentioned components will be detailed below. The support shaft 1 is disposed to be almost parallel with the rotation center axis of a disk holder (not shown) for holding and rotating the optical disk, i.e., almost perpendicular to the recording plane of the optical disk. The mount 2 where the support shaft 1 is fixed is of a platelike member, under which an optical system including a laser light source (not shown) is disposed. 21 is a reflecting plate composing part of the optical system. These components, mount 2, optical system and the like are held on a head slider (not shown) and can be uniformly carried in the direction of crossing tracks of the optical disk.

The lens holder 3 is of a disklike member and is rotatably engaged to the support shaft 1 through the cylindrical portion 64 of the optical path length changing member 6 by a support hole 32 formed vertically in the central part of the disklike member. Also, a holding hole 33 is vertically formed near the edge of the lens holder 3, and the objective lens 31 is fitted in the holding hole 33.

Close to the edge of the lens holder 3, there are formed two curved walls 22A, 22B (omitted in FIG. 2), which are opposite to a part of the edge of the lens holder 3, rising from the mount 2. The curved walls 22A, 22B are disposed to be symmetrically located sandwiching the support shaft 1, and the tracking drive means 4 and the focusing drive means 5 (both omitted in FIG. 2) are attached to both the opposite planes of the curved walls 22A, 22B and the lens holder 3.

The tracking drive means 4 is composed of magnets 41A, 41B attached to the curved walls 22A, 22B, respectively, and drive coils 42A, 42B (42B not shown in FIG. 1) attached to the lens holder 3. By this arrangement, the rotation movement of the lens holder 3 around the support shaft 1 is activated to conduct the tracking operation. Meanwhile, the lens holder 3 is previously so positioned that the direction where the objective lens 31 is moved by the rotation movement can cross the tracks of the optical disk. Also, the magnets 41A, 41B are set to have such a sufficient length in the direction of the rotation movement that can be applied to the rotation movement when the switching operation of the optical path length changing member 6, which is explained later, is conducted.

The focusing drive means 5 is composed of magnets 51A, 51B attached to the curved walls 22A, 22B, respectively, and drive coils 52A, 52B (52B not shown in FIG. 1) attached to the lens holder 3. By this arrangement, the reciprocative movement of the lens holder 3 along the support shaft 1 is activated to conduct the focusing operation so that the objective lens 31 is moved close to or apart from the optical disk.

Figure 2:
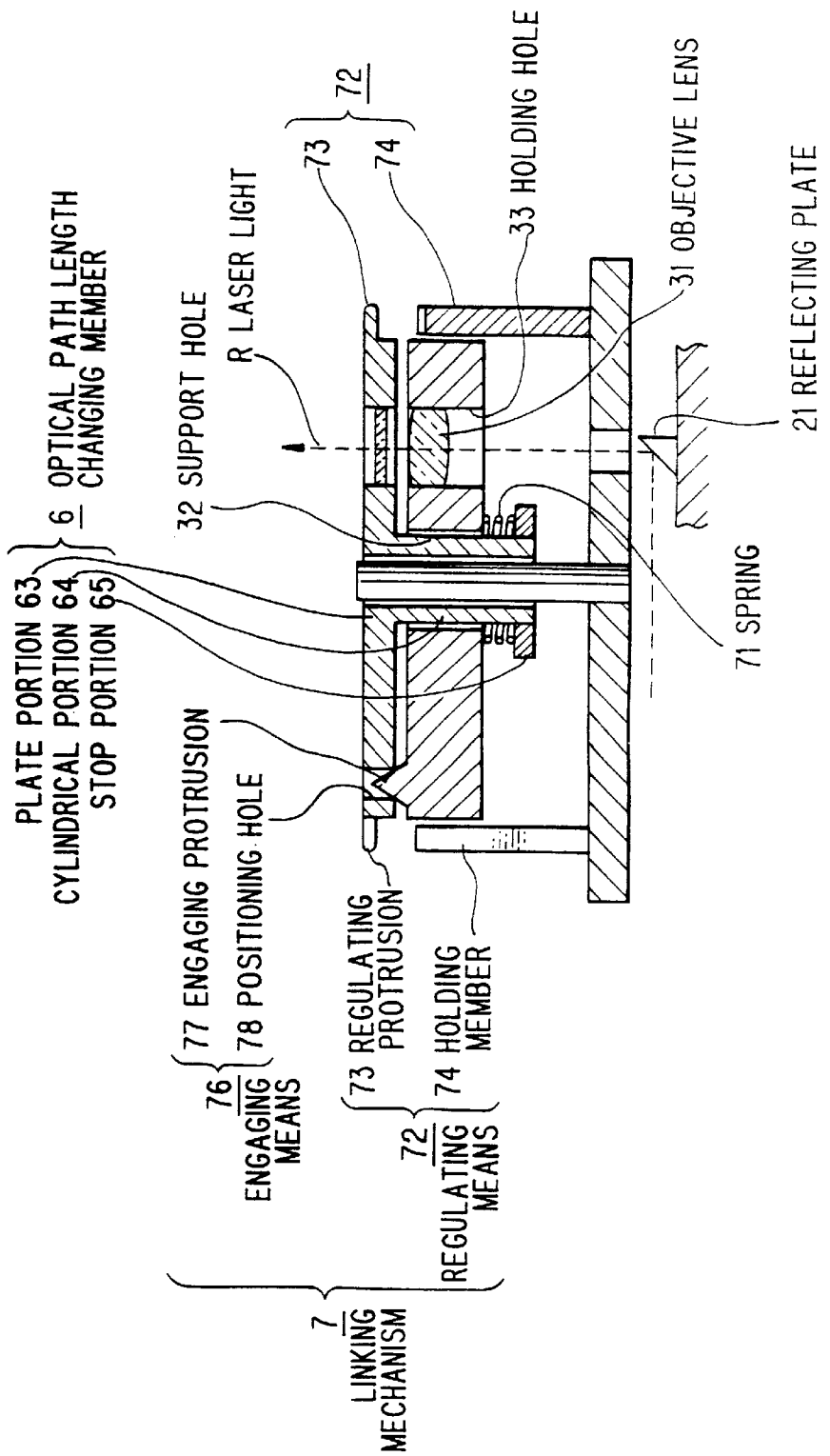
FIG. 2 is a cross sectional view cut along the line A—A in FIG. 1, and FIGS. 3A to 3E are partial side views to be seen from the direction B in FIG. 1.

Next, the optical path length changing member 6 will be detailed. The optical path length changing member 6 is, as shown in FIG. 2, composed of a disklike plate portion 63 where the transparent plate 61 and through-hole 62 are provided, the cylindrical portion 64 and a stop portion 65 for stopping a spring 71 explained later.

The plate portion 63 of the optical path length changing member 6 is located opposite to the top surface of the lens holder 3 and over the lens holder 3 (on the side of the optical disk), formed as a disklike member with a diameter nearly equal to that of the lens holder 3, rotatable and slidable around or along the support shaft 1 as well as the cylindrical portion 64. Also, both the distance from the support shaft 1 to the transparent plate 61 and the distance from the support shaft 1 to the through-hole 62 on the plate portion 63 are equal to the distance from the support shaft 1 to the objective lens 31 on the lens holder 3. Further, both the transparent plate 61 and the through-hole 62 are disposed at such positions that they can be opposite to the objective lens 31 by the relative rotation movement of the optical path length changing member 6.

The cylindrical portion 64 of the optical path length changing member 6 is inserted into a support hole 32 which is located in the center of the lens holder 3. Therefore, both the lens holder 3 and the optical path length changing member 6 can be individually moved around or along the support shaft 1.

The stop portion 65 of the optical path length changing member 6 holds the spring 71 between the bottom surface of the lens holder 3 and the stop portion 65. The elasticity of the spring 71, provides the force that the lens holder 3 and the plate portion 63 of the optical path length changing member 6 are urged toward each other.

Meanwhile, the lens holder 3, which is located apart from the mount 2, can be supported by the insertion of an elastic body (not shown) which does not impede the rotation movement or by an attractive force or repulsive force between the magnet 51A and the drive coil 52A of the focusing drive means 5.

Now, the transparent plate 61 will be detailed. As described earlier, the optical disk device 10 in this embodiment is used to reproduce from both a normal optical disk and a high-density optical disk. The normal optical disk is generally composed of a transparent disk and a recording plane formed on one surface of the transparent disk. In reproduction, laser light is converged through the transparent plate to the recording plane, and then information recorded on the recording plane is read out by reflected light.

On the other hand, the high-density optical disk is formed by fixing together two optical disks, each of which is composed of a transparent disk which is of the same material as a normal optical disk and has a thickness half that of a normal optical disk and a recording plane formed on one surface of the transparent disk. In reproduction, laser light is supplied through the transparent disk with the half thickness.

Thus, as compared with a normal optical disk, the optical path length is different by the thickness of the transparent disk.

The transparent plate 61 is of the same material as the transparent disk of an optical disk and has a thickness half that of a normal optical disk. By transmitting through the transparent plate 61, the optical path length of laser light can be made uniform.

Meanwhile, the optical disk device in this embodiment is applicable to both a normal optical disk and a high-density optical disk where two optical disks with a thickness half that of a normal optical disk are fixed together. However, an optical disk device according to this invention is not limited to the use for these optical disks. For example, it is applicable to any different kinds of two optical disks between which there exists a difference in optical path length in reproduction. In this case, another transparent plate with a refractive index and a thickness to give an optical characteristic for correcting the difference in optical path length is necessary. Also, means to form the change region is not limited to the transparent plate. For example, an iris member with a pinhole which has a like function may be used.

The through-hole 62 serves to simply pass laser light through the plate portion 63 of the optical path length changing member 6 and does not affect the laser light when passed through it. Thus, the through-hole 62 may have any structure that does not shut off the laser light, i.e., it may have a longer diameter and its shape is not limited. Also, the unchanged region may be formed by notching the plate portion 63 except forming the through-hole in the plate portion 63.

Next, the linking mechanism 7 will be detailed. The linking mechanism 7 is composed of a spring 71, a regulating means 72 for regulating the movement of the optical path length changing member 6 toward the lens holder 3 within a predetermined amount of movement, and an engaging means 76 which is disposed between the optical path length changing member 6 and the lens holder 3 and serves to link or separate the optical path length changing member 6 to or from the lens holder 3 according to a variation in the distance therebetween.

The regulating means 72 is composed of a rod-shaped regulating protrusion 73 which protrudes from the edge of the plate portion 63 of the optical path length changing member 6 in the radial direction of the rotation movement of the plate portion 63, and holding members 74, 75 which are disposed under the regulating protrusion 73 (on the side of the lens holder 3) and stands fixed on the mount 2.

The holding member 74 is disposed at a position where it is located under the regulating means 73 when the objective lens 31 held by the lens holder 3 and the transparent plate 61 are uniformly present in the optical path of laser light, and the holding member 75 is disposed at a position where it is located under the regulating means 73 when the objective lens 31 and the through-hole 62 are uniformly present in the optical path of laser light. Also, at the top central portions of the holding members 74, 75, there are formed notches which hold the regulating protrusions 73 to prevent the optical path length changing member 6 from rotatably moving around the support shaft 1 when the optical path length changing member 6 goes down. Further, the holding member 74, 75 have such a height that there is a predetermined clearance between the top of the holding member 74 or 75 and the regulating protrusion 73 so as to not contact each other in at least a normal focusing operation (for correcting a plane pitching of optical disk).

Meanwhile, the regulating means 72, 72 are disposed at two positions symmetrical to the support shaft 1.

On the other hand, the engaging means 76 is composed of an engaging protrusion 77 formed on the lens holder 3, and positioning holes 78, 79 which are formed in the plate portion 63 of the optical path length changing member 6 corresponding to the engaging protrusion 77 and corresponding to the transparent plate 61 and the through-hole 62, respectively, of the optical path length changing member 6.

The engaging protrusion 77 has a conical shape whose tip faces the plate portion 63 of the optical path length changing member 6. On the other hand, the positioning holes 78, 79 are through-holes vertically extending through the plate portion 63, and they are disposed at such positions that the engaging protrusion 77 is located opposite to the positioning hole 78 when the objective lens 31 held by the lens holder 3 is opposite to the transparent plate 61, and the engaging protrusion 77 is located opposite to the positioning hole 79 when the objective lens 31 is opposite to the through-hole 62.

Here, as described earlier, the spring 71 urges the plate portion 63 of the optical path length changing member 6 to be close to the lens holder 3. Therefore, when the engaging protrusion 77 is located opposite to either of the positioning holes 78, 79, they are engaged with each other. Thus, the tracking and focusing operations are conducted by the lens holder 3 and optical path length changing member 6 to be unified by the engagement.

The engaging protrusion 77 is engaged with the positioning hole 78 or 79 while being simply inserted thereinto. Therefore, when a force to separate the lens holder 3 and the plate portion 63 against the spring 71 is applied, the engagement is easily released and lens holder 3 and the plate portion 63 are separated. In this case, only the lens holder 3 rotates around the support shaft 1 and reciprocates along the support shaft 1.

Meanwhile, the engaging means 76, 76 are disposed at two positions symmetrical to the support shaft 1.

Next, the operation of the optical disk device in the embodiment will be explained in FIGS. 3A to 3E.

Figure 3A:
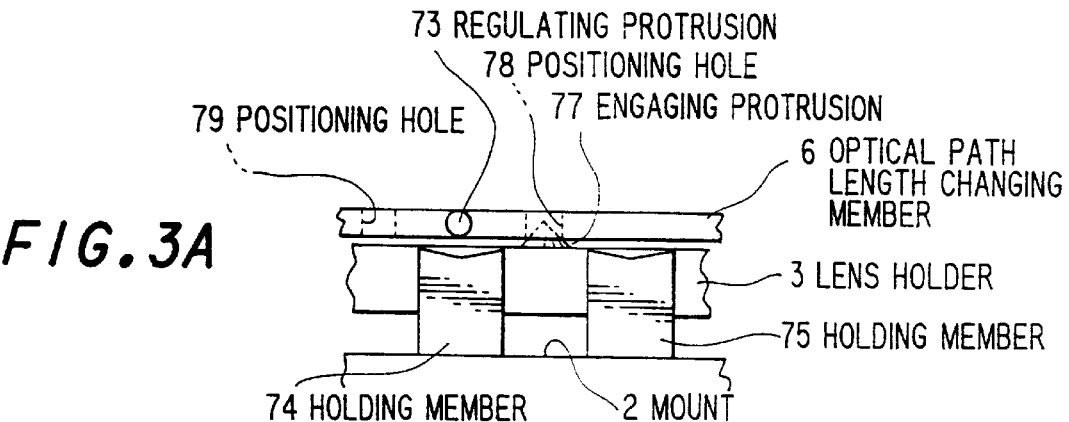

First, when a high-density optical disk is reproduced, between the lens holder 3 and the optical path length changing member 6, the engaging protrusion 77 is previously engaged with the positioning hole 78 so as to position both the objective lens 31 and the transparent plate 61 in the optical path of laser light (FIGS. 3A and 1).

In this state, laser light is emitted, and the lens holder 3 and the optical path length changing member 6 to be unified are rotated and reciprocated together to conduct the tracking and focusing operations while being activated by the tracking drive means 4 and the focusing drive means 5. In the focusing operation, the regulating protrusion 73 of the regulating means 72 does not contact the holding member 74.

Figure 3B:
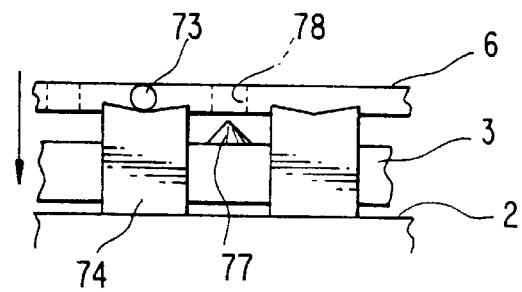

Next, when the high-density optical disk is replaced by a normal optical disk, the switching operation from the transparent plate 61 to the through-hole 62 on the optical axis of laser light in the optical path length changing member 6 is conducted accordingly. Namely, the focusing drive means 5 first activates the lens holder 3 to go down. In this descending movement, the lens holder 3 and the optical path length changing member 6 simultaneously go down, and then the regulating protrusion 73 fixed to the plate portion 63 of the optical path length changing member 6 contact the holding member 74. Thus, the regulating protrusion 73 prevents the optical path length changing member 6 from going down, but the descending movement is further continued against the elasticity of the spring 71. Therefore, the plate portion 63 and the lens holder 3 are separated and the engaging protrusion 77 of the engaging means 76 is thereby extracted from the positioning hole 78 (FIG. 3B).

Figure 3C:
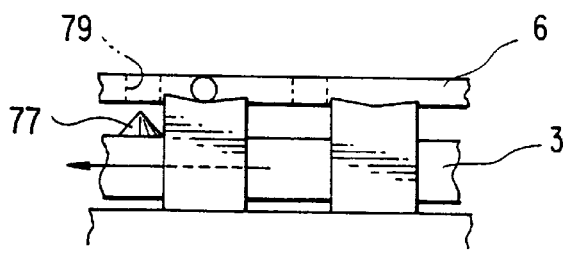

Then, the lens holder 3, which is disengaged from the engaging means 76, solely rotates up to a position where the engaging protrusion 77 is opposite to the positioning hole 79 while being activated by the tracking drive means (FIG. 3C). In this state, the objective lens 31 held by the lens holder 3 is brought to be opposite to the through-hole 62 of the optical path length changing member 6.

Figure 3D:
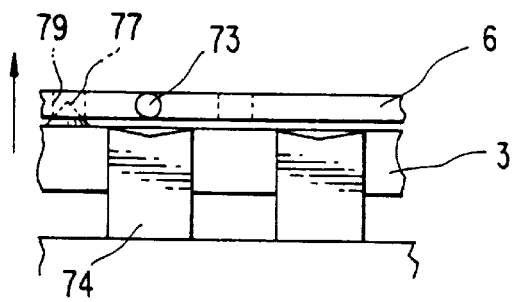

Then, the lens holder 3 is activated to go up by the focusing drive means 5, and the engaging protrusion 77 is thereby inserted into the positioning hole 79. Thus, the lens holder 3 is engaged with the optical path length changing member 6 and the regulating protrusion 73 is separated from the holding member 74 (FIG. 3D).

Figure 3E:
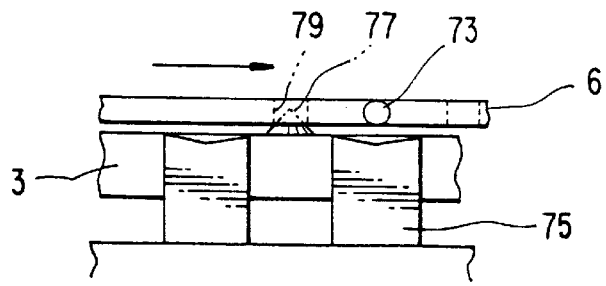

Further, the lens holder 3 and the optical path length changing member 6 to be engaged with the lens holder 3 are activated to rotate by the tracking drive means 4, and then the objective lens 31 and the through-hole 62 are positioned on the optical axis of laser light. Thereby, the regulating protrusion 73 is located over the holding member 75 (FIG. 3E).

Thus, like the case of the high-density optical disk, the reproducing, tracking and focusing operations are conducted.

In the above-mentioned operations, the operations of the tracking drive means 4 and the focusing drive means 5 are sequentially controlled by using an operation controlling means (not shown).

As described above, in this embodiment, the optical path length changing member 6 is disposed on the optical path of laser light, and the laser light is projected on the optical disk while selecting either of the transparent plate 61 and the through-hole 62. Therefore, the optical disk device in the embodiment can be applied to both a normal optical disk and a high-density optical disk.

Also, the switching operation of the optical path length changing member 6 is conducted by using the engagement or the disengagement with or from the lens holder 3 by the linking mechanism 7, the rotation movement by the tracking drive means 4 and the reciprocative movement by the focusing drive means 5. Thus, the separate driving source in the convention optical disk device is not necessary. Therefore, the optical disk device in the embodiment can be miniaturized and lightened, the device structure can be simplified and the number of parts can be reduced.

Furthermore, the lens holder 3 and the optical path length changing member 6 can be releasably engaged with each other by the linking mechanism 7 to simultaneously conduct the focusing operation. Therefore, collision between the objective lens 31 and the optical path length changing member 6 in the focusing operation, which may occur in the conventional optical disk device, can be effectively prevented.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical disk device for projecting laser light emitted from a laser light source on an optical disk to reproduce information, comprising:

a support shaft disposed nearly parallel with an optical axis of said laser light;

a mount on which said support shaft is fixed;

a lens holder rotatably disposed around said support shaft and reciprocally movable along said support shaft as well as holding an objective lens for converging said laser light upon a recording plane of said optical disk;

a tracking device for activating rotational movement along said support shaft of said lens holder;

a focusing drive for activating reciprocal movement along said support shaft of said lens holder;

an optical path length changing member which has a change region where an optical path length is changed when said laser light is transmitted therethrough and an unchanged region where an optical path length is not changed when said laser light is transmitted therethrough is located closer to said optical disk than said lens holder rotatably disposed around said support shaft and reciprocally movable along said support shaft; and a linking mechanism for effecting the engagement or disengagement of said optical path length changing member with said lens holder, wherein said linking mechanism comprises a regulator for regulating the movement of said optical path length changing member to said lens holder within a predetermined amount of movement, and an engaging device disposed between said optical path length changing member and said lens holder for effecting the connection or separation of said optical path length changing member and said lens holder according to a variation in distance between them, and wherein said engaging device comprises an engaging protrusion formed on one of said lens holder and said optical path length changing member, and positioning holes formed on the other of said lens holder and said optical path length changing member opposite to said engaging protrusion and individually corresponding to said change region and said unchanged region of said optical path length changing member.

2. An optical disk device for projecting laser light emitted from a laser light source on an optical disk to reproduce information, comprising:

an optical disk formed of two disks of like thickness fixed together;

a support shaft disposed nearly parallel with an optical axis of said laser light;

a mount on which said support shaft is fixed;

a lens holder rotatably disposed around said support shaft and reciprocally movable along said support shaft as well as holding an objective lens for converging said laser light upon a recording plane of said optical disk;

a tracking drive for activating rotational movement of said lens holder;

a focusing drive for activating reciprocal movement along said support shaft of said lens holder;

an optical path length changing member which has a change region where an optical path length is changed when said laser light is transmitted therethrough and an unchanged region where an optical path length is not changed when said laser light is transmitted therethrough is located closer to said optical disk than said lens holder and rotatably disposed around said support shaft and reciprocally movable along said support shaft; and a linking mechanism for effecting the engagement or disengagement of said optical path length changing member with said lens holder, said linking mechanism comprising a regulator for regulating the movement of said optical path length changing member to said lens holder within a predetermined amount of movement, and an engaging device disposed between said optical path length changing member and said lens holder for effecting the connection or separation of said optical path length changing member and said lens holder according to a variation in distance between them, wherein said engaging device comprises an engaging protrusion formed on one of said lens holder and said optical path length changing member, and positioning holes formed on the other of said lens holder and said optical path length changing member opposite to said engaging protrusion and individually corresponding to said change region and said unchanged region of said optical path length changing member.

* * * * *